US006296118B1

United States Patent
Speck

(10) Patent No.: US 6,296,118 B1
(45) Date of Patent: Oct. 2, 2001

(54) STACKABLE, NESTABLE, AND REUSABLE CONTAINER FOR STORING AND DISPENSING ELONGATED MATERIALS, AND METHOD OF USING SAME

(76) Inventor: John W. Speck, 37748 Meadow Hill, Northville, MI (US) 48167

( * ) Notice: Subject to any disclaimer, the term of this patent is extended or adjusted under 35 U.S.C. 154(b) by 0 days.

(21) Appl. No.: 09/588,845

(22) Filed: Jun. 7, 2000

(51) Int. Cl.⁷ ...................................................... B65D 85/06
(52) U.S. Cl. ........................... 206/408; 206/506; 206/519
(58) Field of Search ...................................... 206/397, 408, 206/409, 503, 506, 509, 515, 519

(56) References Cited

U.S. PATENT DOCUMENTS

| | | |
|---|---|---|
| 2,412,178 * 12/1946 | Seigh | 206/519 |
| 3,840,115 * 10/1974 | Ladewig | 206/506 |
| 4,015,795 4/1977 | Chong . | |
| 4,032,078 6/1977 | Van de Loock . | |
| 4,140,289 2/1979 | Kovaleski . | |
| 4,623,063 11/1986 | Balkin . | |
| 4,967,978 11/1990 | Roberts . | |
| 5,062,580 11/1991 | Meagher . | |
| 5,078,269 1/1992 | Dekko et al. . | |
| 5,103,977 4/1992 | Douglas . | |
| 5,139,209 8/1992 | Kramer . | |
| 5,154,303 * 10/1992 | Jordan | 206/506 |
| 5,390,790 2/1995 | Straub et al. . | |
| 5,490,595 2/1996 | Sakai et al. . | |
| 5,634,569 * 6/1997 | DeCoster | 206/519 |
| 5,738,209 4/1998 | Burr et al. . | |
| 5,921,391 7/1999 | Oritz et al. . | |

* cited by examiner

*Primary Examiner*—David T. Fidei
(74) *Attorney, Agent, or Firm*—Carrier, Blackman & Associates, P.C.; Joseph P. Carrier; William D. Blackman

(57) ABSTRACT

A stackable, nestable, and reusable container for storing, transporting, and dispersing elongated materials, such as wire or cable. The container includes a first substantially cylindrical portion, a second substantially cylindrical portion located concentrically within the first portion, a container bottom interconnecting the lower ends of the substantially cylindrical portions so as to define an annular channel therebetween for storing a coil of elongate material therein; and a mechanism provided with at least one of the first and second substantially cylindrical portions for securely supporting an identical second container thereon when the second container is in a rotatively aligned stacking configuration with the first container, and for compactly receiving the second container in the annular channel when the second container is in a rotatively aligned nesting configuration with the first container. Preferably, the first substantially cylindrical portion has at least one aperture defined in an upper section thereof for dispensing the elongate material therethrough, and the first and second substantially cylindrical portions slopingly diverge with respect to one another, such that a width of said channel slopingly increases, extending upwardly from the container bottom.

20 Claims, 7 Drawing Sheets

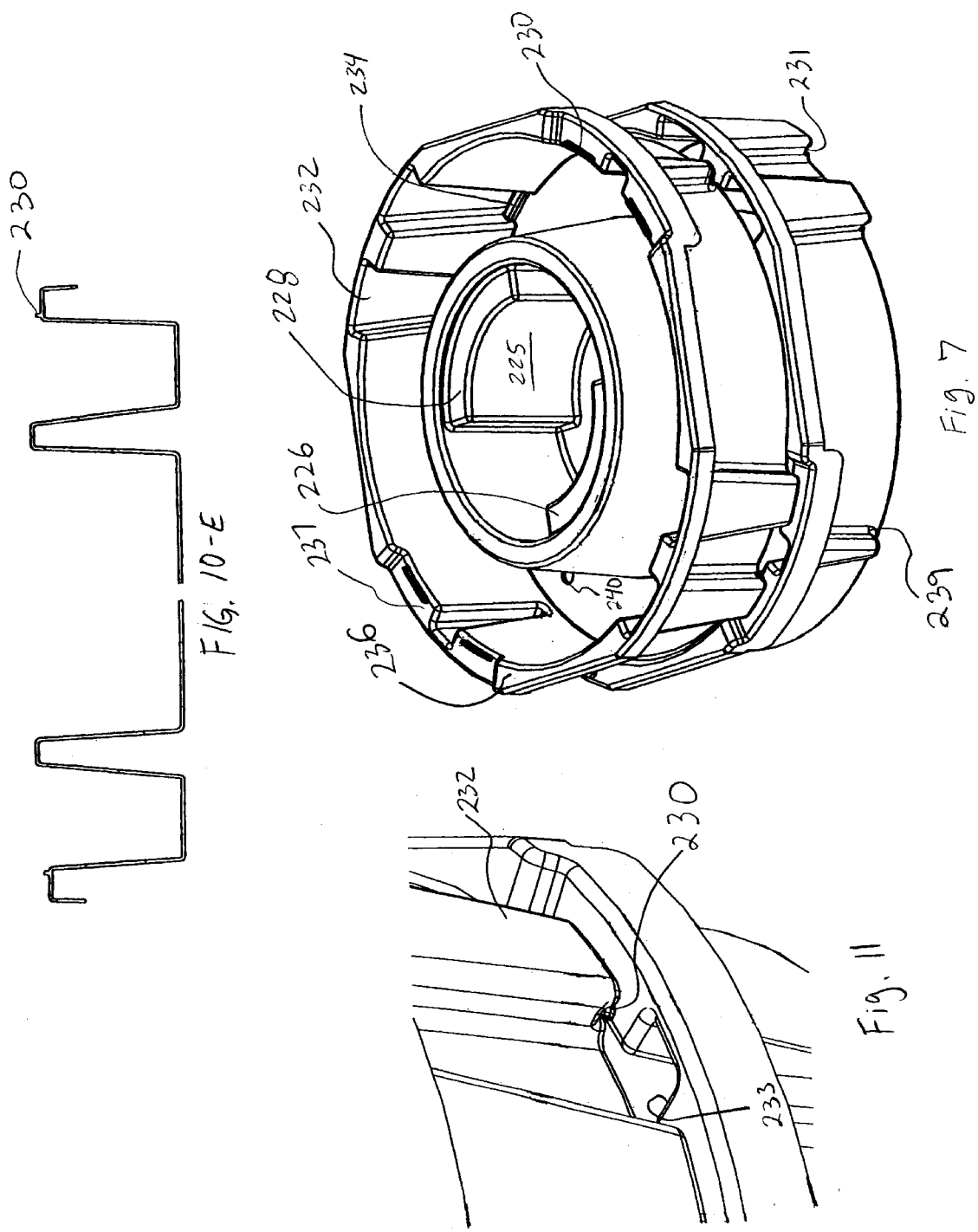

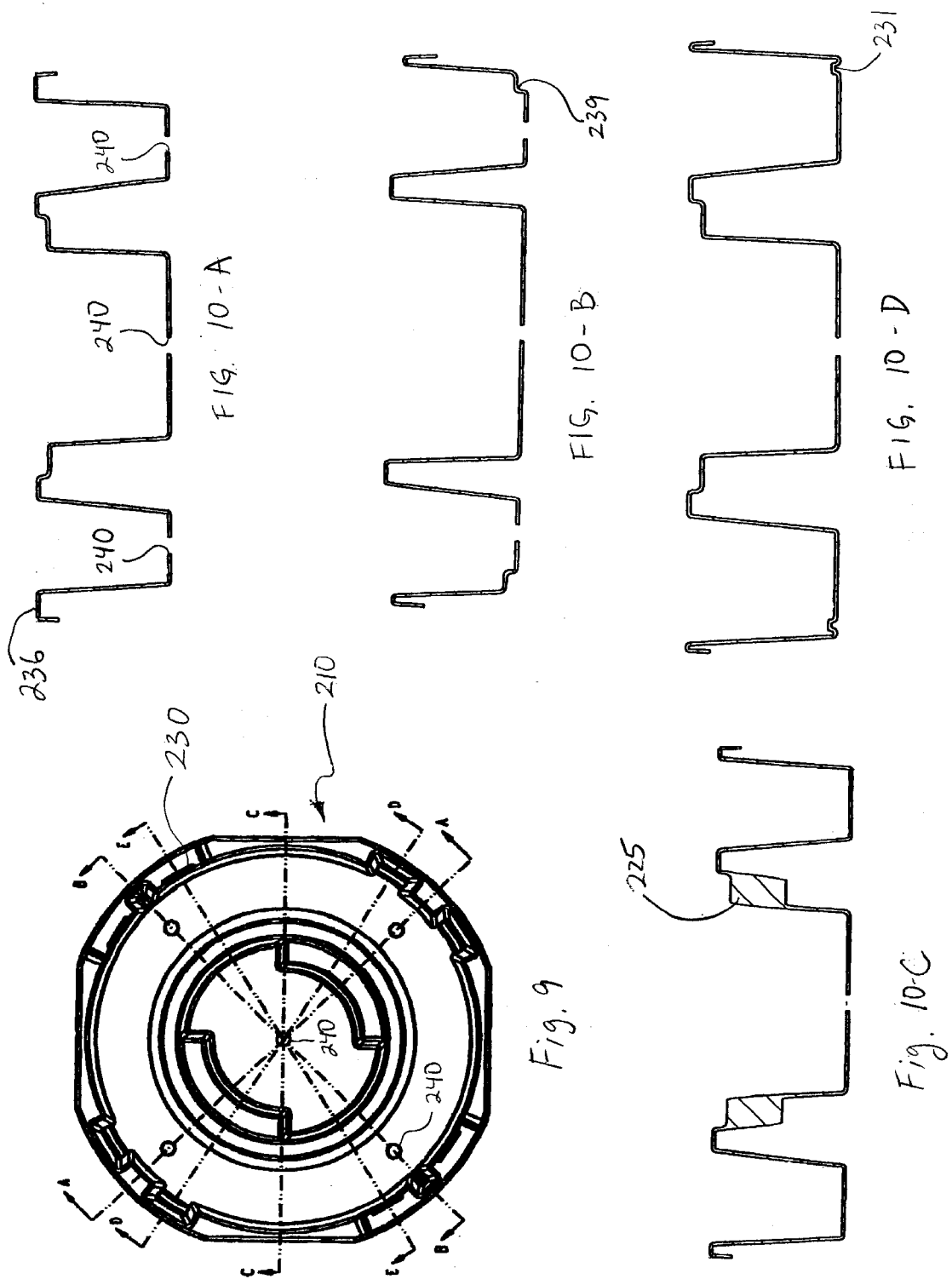

STACKABLE, NESTABLE, AND REUSABLE CONTAINER FOR STORING AND DISPENSING ELONGATED MATERIALS, AND METHOD OF USING SAME

BACKGROUND OF THE INVENTION

1. Field of the Invention

The present invention relates to storage containers for elongated materials such as wire or cable, and methods of use thereof More particularly, the present invention relates to a stackable, nestable, and reusable container for elongated materials, which is usable for storing, transporting and dispensing elongated material, and to a method of using same.

2. Background Art

Storage containers for elongate materials are widely used in industrial settings. In particular, large industrial reels are commonly used in shipping and manufacturing. Commonly used types of large industrial reels are described in U.S. Pat. Nos. 5,139,209; 4,967,978; 4,140,289; and 4,032,078. These containers provide excellent storage for large quantities of wire or other elongate materials, and allow for relatively simple dispensing of the elongate materials in a controlled manner through rotation of the reels about their respective central axis. They are however difficult to handle and are often undesirable when smaller elongate material quantities are needed.

Other containers are typically used for shipping and storing smaller quantities of wire or other elongate materials. Commonly used types of smaller containers, which are often made from fibreboard, are disclosed in U.S. Pat. Nos. 5,390,790; 4,623,063; and 4,511,037. These containers are easier to handle than large storage reels, but are typically not reusable, and therefore become expensive for large scale use. They are also impractical to use for many industrial applications, because they typically do not allow for simple dispensing of the elongate material Dekko, U.S. Pat. No. 5,078,269 has disclosed a smaller, disposable container that allows for improved dispensing of elongate materials stored thereon; however, the Dekko disclosure requires the use of special equipment for coiling elongate material on the container, and dispensing the elongate material therefrom. The Dekko patent discloses a flat sheet of material, preferably octagonally shaped fibreboard, having a central opening therethrough. The elongate material is coiled on top of a planar surface of the flat sheet, and bound by bands or straps to the flat sheet for shipping and storage. The Dekko disclosure includes a two-part wire receptacle apparatus that holds the flat sheet while elongate material is coiled thereon, for forming a packaged shipping unit of elongate material. For dispensing the elongate material, the Dekko disclosure requires a second apparatus for retaining the shipping unit and providing for dispensing of the elongate material. Although attempting to address the problems associated with dispensing elongate materials stored on smaller-type disposable containers, the Dekko disclosure falls short by requiring additional apparatus special to coiling and dispensing the elongate material.

In order to reduce the costs associated with disposable containers, Sakai, U.S. Pat. No. 5,490,595, has disclosed a reusable container for the shipping and storage of elongate materials. The Sakai disclosure includes a round tub-shaped container preferably made from a synthetic resin, having a central hole formed in the base of the container, and a central hub, wherein an annular space is formed within the container between hub and the inner container wall. The inner container wall slopes inward such that the top of the inner wall has a larger diameter than the base of the inner wall, which allows the containers to be partially nested within one another when stacked. The outer container wall includes downwardly oriented tabs that extend partially down the outer wall, which tabs limit the amount of nesting when multiple containers are stacked, in order to prevent damage to wire stored in lower containers within the stack.

The Sakai disclosure provides for a stackable, nestable, and reusable container for strong elongate materials that reduces costs associated with disposable, smaller containers, but the Sakai disclosure fails to provide an industrially effective means of dispensing the elongate material. Dispensing the elongate material with the Sakai disclosure is accomplished by merely uncoiling the elongate material from top of the tub-shaped container. Such dispensing method encourages the entire coil of elongate material to undesirably be withdrawn in bulk from the container if any snags occur between strands of elongate material during dispensing. Additionally, the multi-pronged hub of the Sakai disclosure favors snagging of elongate material thereon during dispensing, and the method of stacking Sakai containers wherein hub prongs from lower containers extend into the hub area of the dispensing container, further increases snagging opportunities.

While numerous varieties of containers are known and available for shipping, storing, and dispensing elongate materials of various types, a need still exists for an improved storage and dispensing container for elongate materials. In particular, there is a need for an elongate material container which is stackable for industrial applications and during storage of elongate materials, nestable for shipping and storage when empty, and reusable for cost savings, which allows for simple and efficient dispensing of elongate materials contained therein.

SUMMARY OF THE INVENTION

The present invention has been developed to overcome the foregoing limitations and disadvantages of known storage containers for elongated materials, and to generally fulfill a need in the art for an elongate material container which is stackable during storage of elongate materials, nestable for shipping and storage when empty, and reusable, and which also allows for simple and efficient dispensing of elongate materials contained therein.

According to the invention there is provided a reusable container for storing, transporting, and dispensing elongate materials. A container in accordance with the present invention includes a first substantially cylindrical portion, a second substantially cylindrical portion located concentrically within the first portion, a container bottom interconnecting the lower ends of the cylindrical portions so as to define an annular channel therebetween for storing a coil of elongate material therein, and means provided with at least one of said first and second cylindrical portions for securely supporting an identical second container thereon when the second container is in a rotatively aligned stacking configuration with the first container, and for compactly receiving the second container in the annular channel when the second container is in a rotatively aligned nesting configuration with the first container.

Such container is advantageous because it permits very efficient storage, transport and dispensing of coiled elongate materials such as wire in relatively small quantities when the container is used together with other identical containers in the stacking configuration, and permits even more efficient storage and transport when returning the empty containers as disposed together in the nesting configuration.

Preferably, the supporting and receiving means is provided with both of the first and second substantially cylindrical portions, the first substantially cylindrical portion includes a lip extending radially outwardly around an upper edge thereof, and the supporting and receiving means includes mating projections and recesses defined in the first and second substantially cylindrical portions, the bottom wall, and the lip for securely maintaining the containers in the stacking and nesting configurations. Additionally, the first portion has at least one aperture defined in an upper section thereof for dispensing the elongate material through, and the first and second substantially cylindrical portions slopingly diverge with respect to one another, such that the width of the annular channel slopingly increases from the bottom wall to the upper surfaces of the substantially cylindrical portions.

It is desirable that the container further have at least one securement aperture defined in an upper portion of the second cylindrical portion, and that each securement aperture is diametrically aligned with each dispensing aperture, to allow for securement of the coiled elongate material by a strap or other securement means. Both the securement aperture and the dispensing aperture are preferably U-shaped, but they may also be defined as a hole. For ease of fastening and unfastening any securement means, the securement means preferably includes material straps having a hook and loop fastener, such as that sold commercially under the mark "VELCRO®".

It is an object of the present invention to provide a re-usable storage container for elongate materials which may be efficiently used for storing, transporting and dispensing relatively small quantities of the coiled elongate materials.

Another object of the present invention is to provide such a storage container for elongate materials, in which multiple filled containers can be securely stacked vertically on top of one another in a first configuration, with interior storage channels of adjacent containers spaced apart a predetermined distance from one another, and multiple empty containers can be stacked vertically and nestingly close together on top of one another in a second configuration, to allow for efficient use of space during shipping thereof.

Still another object of the invention is to provide such a container which is economical to produce, and highly durable and reliable in construction.

Yet another object of the invention is to provide such a container which permits smooth dispensing of the elongate materials stored therein, but which has a reduced horizontal dimension for more efficient storage and transportation thereof.

For a more complete understanding of the present invention, the reader is referred to the following detailed description section, which should be read in accordance with the accompanying drawings. Throughout the following description, like numbers refer to like parts.

BRIEF DESCRIPTION OF THE DRAWINGS

FIG. 9 is a top plan view one of the storage containers of FIG. 7;

FIGS. 10A–10E are side sectional views taken respectively along lines A—A, B—B, C—C, D—D, and E—E in FIG. 9; and FIG. 11 is a enlarged perspective view of one portion of FIG. 7.

DETAILED DESCRIPTION OF THE PRESENTLY PREFERRED EMBODIMENTS

Figure 1A:
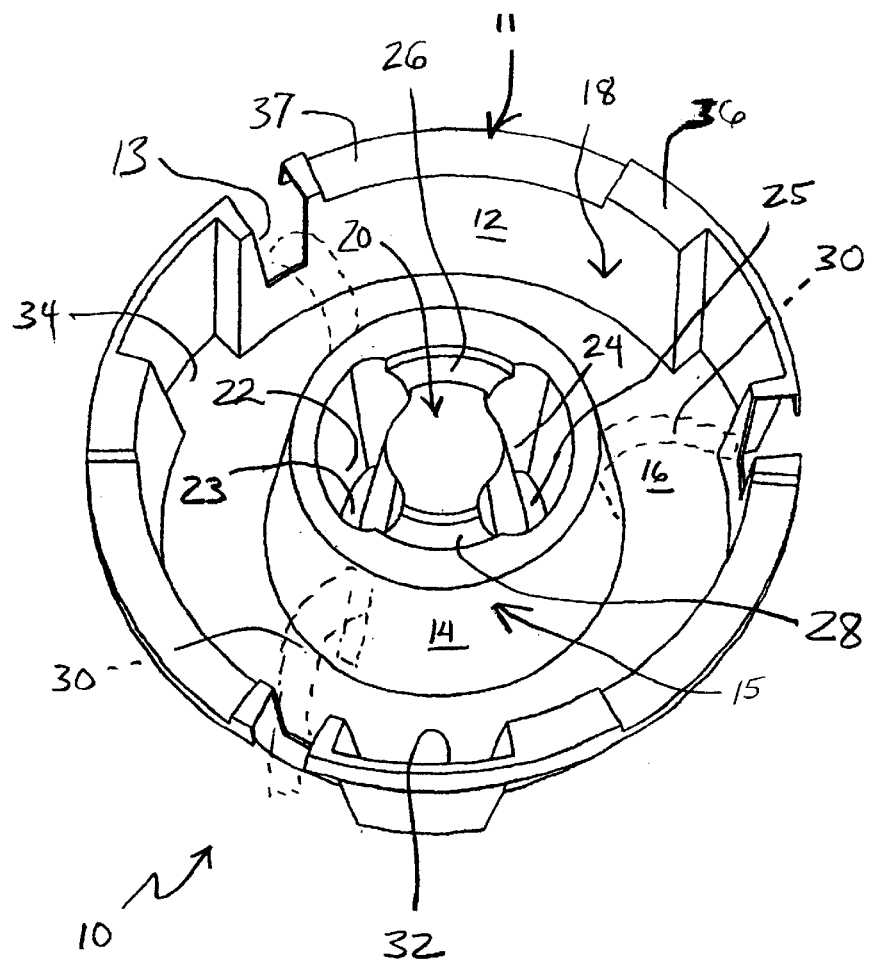
FIG. 1A is a perspective view of a storage container in connection with a first embodiment of the invention.

Referring now to FIG. 1A, a storage container in accordance with a first embodiment of the present invention is shown generally at 10. The storage container 10 is usable for storing, transporting, and dispensing elongate materials such as insulated metal wire. The container 10 includes a container body 11 which is preferably made of a strong, impact-resistant and relatively inexpensive plastic such as the blended polymer michelene polyethylene, etc. The container 10 is preferably molded as a one-piece, unitary member, and may be made by injection molding because such molding can be most efficient when manufacturing large quantities of the containers. Otherwise the containers could be manufactured by vacuum forming or by other methods known in the art.

The container body 11 includes a first, or outer, substantially cylindrical wall member or portion 12, a second, inner, substantially cylindrical wall member or portion 14 located concentrically within the first wall member. A container floor or bottom 16 interconnects the lower ends of the cylindrical wall members. An annular channel 18 is defined between the wall members 12, 14 and above the floor 16 for storing a coil (not shown) of elongate material therein. Additionally, the outer wall member 12 has at least one dispensing aperture 13 defined in an upper portion thereof for dispensing the elongate material through The dispensing aperture 13 is preferably a U-shaped cut-out, but may also be defined as a hole.

Preferably, the inner wall member 14 forms the outer surface of a central boss 15 which is provided as an integral part of the container body 11. The central boss 15 extends upwardly from the floor 16, and includes a substantially horizontal load support surface 20, which closes the upper end of the second cylindrical wall member 14. The central boss 15 has at least one, and more preferably two or more recesses 22, 24 formed therein and extending downwardly from the load support surface 20 within the container 10. At the bottom of the recesses 22, 24, and preferably co-planar with the floor 16, a pair of solid, flat ledges 23, 25 are provided which are integrally formed with the rest of the container body 11. Optionally, the load support surface 20 may have a pair of shallow, curved alignment grooves 26, 28 formed therein on opposite sides thereof.

Another feature of the embodiment of FIG. 1A is that the container body 11 has a plurality of spaced, outwardly extending recesses or alcoves 32 formed in the outer wall member 12 such that they project radially outwardly from the rest of the outer wall member, and the floor 16 has a series of integral tab sections or projections 34 extending radially outwardly below the alcoves.

A horizontally oriented sill or lip 36 is also preferably provided, attached to the top edge of the outer wall member 12 as an integral part of the container body 11. The sill 36 may, optionally, have a plurality of seats 37 formed therein at a lower level than the rest of the sill. The seats 37 are useful for maintaining proper alignment of containers when a plurality of the containers 10 are arranged vertically together in a stacked configuration, i.e., the floor projections 34 of one container are supported on the seats 37 of an underlying container in a stacked configuration thereof such that the floor 16 of the upper container extends sightly within the annular channel of the underlying container, and the containers are prevented from sliding laterally relative to each other.

It is desirable that the container 10 further include at least one securement means 30 attached to an upper portion of the container body 11, and that each securement means is diametrically aligned with a corresponding dispensing aperture 13, to allow for securement of the coiled elongate material by a strap, bar, wire, or other securement structure. For ease of fastening and unfastening any secure means, the securement means 30 preferably includes paired cooperating material straps having a hook and loop fastener, such as the material sold commercially under the mark "VELCRO®".

Figure 1B:
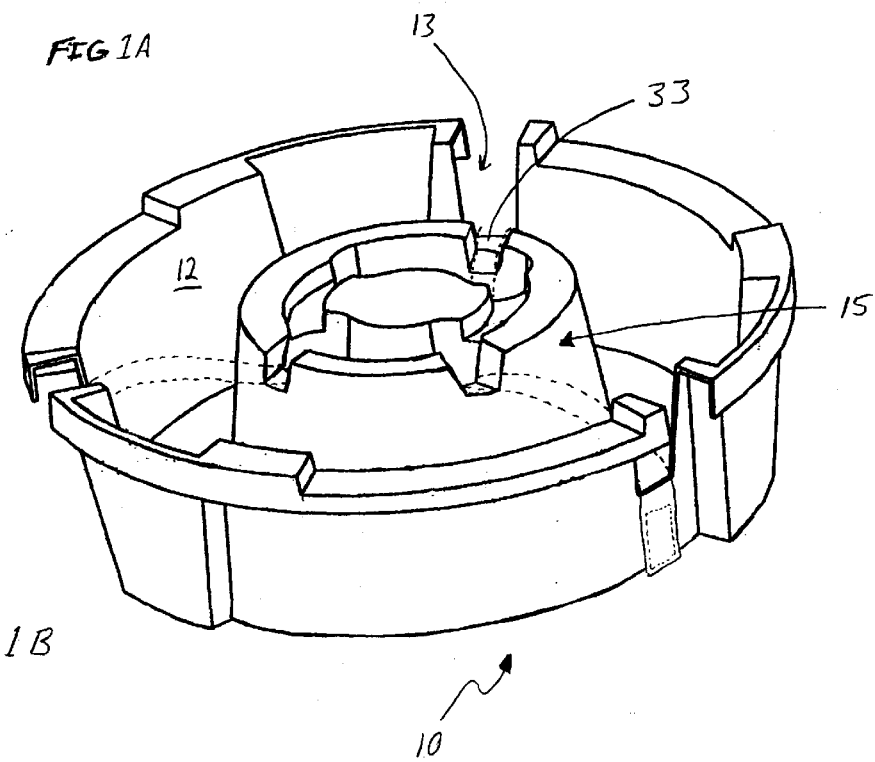
FIG. 1B is a perspective view of a storage container in connection with a first embodiment of the invention having an optional securement means configuration, which includes a securement aperture diametrically aligned with each dispensing aperture.

Optionally, and as shown in FIG. 1B, the central boss 15 may have a plurality of substantially U-shaped cutouts or recesses 33 formed therein, with one of the cutouts aligned with, and spaced diametrically across from, each of the dispensing apertures 13 in the outer wall member 12. The securement means 30 may, as shown for example, include the flexible straps having one end fixed to the outer surface of the first substantially cylindrical member 12 and an opposite free end which may be selectively extended across the top of the coiled material and secured to a fastener disposed on an inner surface of the second substantially cylindrical member 15. Alternatively, the free end of the strap may be extended around the coiled wire and secured to a fastener disposed on the outer surface of the fixed end of the strap, especially if the container does not include the recesses 33 defined in the inner cylindrical member 15. The fixed end of the strap may be connected to the first cylindrical member via adhesive, by being molded therein as an inset or otherwise.

Figure 2:
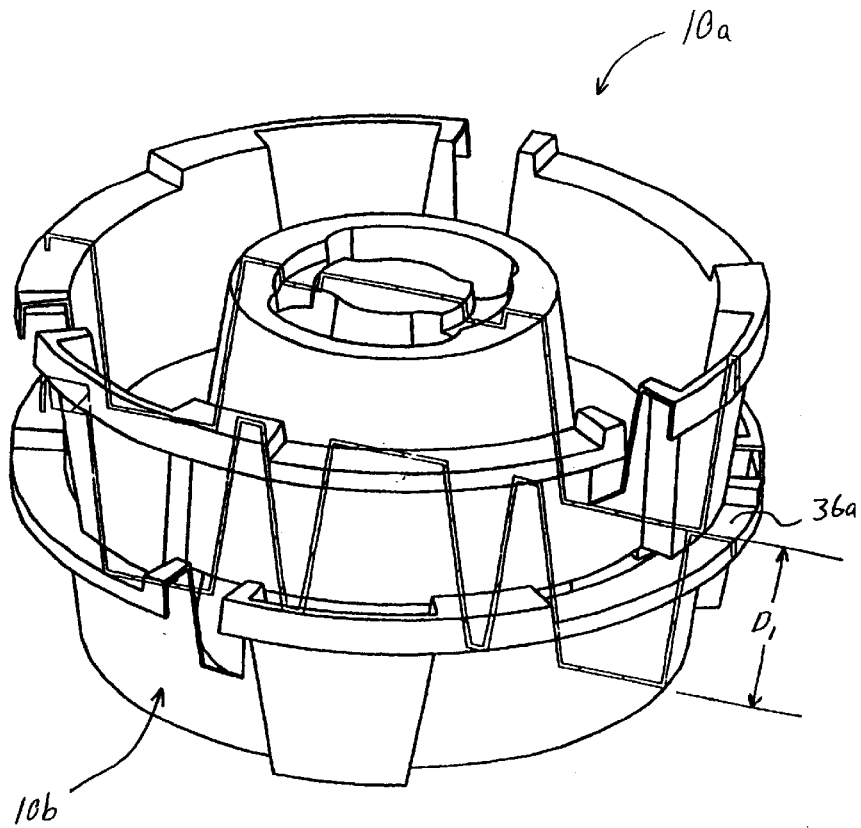
FIG. 2 is a perspective view of a pair of identical storage containers according to the embodiment of FIG. 1, stacked vertically spaced apart in a first relation thereof.

Referring now to FIG. 2, it may be seen that a pair of identical storage containers 10a, 10b are shown stacked vertically spaced apart in a first relation thereof. This first relation is intended for efficiently stacking multiple filled containers 10 together, in a warehouse or transporting trailer, for storage of the material held therein. A cross-sectional slice through the containers 10a, 10b is also shown superimposed in FIG. 2 for purposes of illustration.

In this first configuration of the containers 10a, 10b, the upper container is rotated 90 degrees, about a vertical axis passing through the center thereof, with respect to the orientation of the lower container. As a result, the ledges 23, 25 of the upper container 10a sit on top of the load support surface 20 of the lower container 10b. The ledges 23, 25 seat into the alignment grooves 26, 28 formed in the support surface 20 of the lower container 10b, where such alignment grooves are present. Also in this first relation of the containers 10a, 10b, the floor tab portions 34 of the upper container 10a rest on top of the sill 36 of the lower container, and particularly in the seats 37 if present In this way, and as shown by the cross-sectional view in FIG. 2, the upper container 10a is supported by the lower container 10b with the floors 16, as well as the interior storage channels 18 of the adjacent containers, spaced apart a first distance $D_1$ from one another. This first distance is sufficient to allow full containers to be stacked on top of one another, e.g., 12–18 cm.

Figure 3:
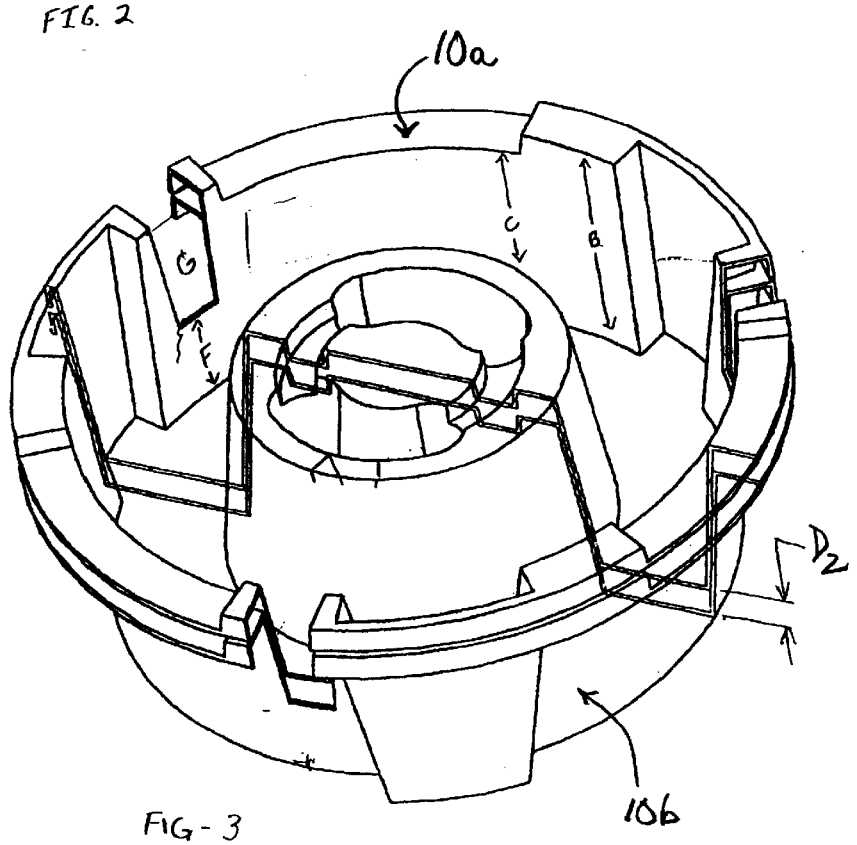
FIG. 3 is a perspective view of a pair of identical storage containers according to the embodiment of FIGS. 1A, 1B, 2, stacked vertically and nested close together in a second relation thereof.

In the second configuration shown in FIG. 3, multiple containers 10a and 10b are stacked vertically and nestingly close together on top of one another when empty, to allow for efficient use of space during shipping or storage thereof in an empty condition. For example, the nested containers shown in FIG. 3 may occupy ½–¼ of the space as occupied by the stacked containers of FIG. 2. Once again, in FIG. 3, a cross-sectional slice through the containers 10a, 10b is shown in the drawing for purposes of illustration. In this second configuration, the containers 10a, 10b are oriented with all of their recesses 22, 24, their alcoves 32, and their other various parts in perfect alignment with one another.

When aligned in this way, the ledges 23, 25 of the upper container fit nestingly into the recesses 22, 24 formed in the central boss 15 of the lower container 10b. Also in this second configuration of the containers 10a, 10b, the floor tab portions 34 of the upper container 10a fit nestingly into the alcoves 32 formed in the outer wall members 12 of the lower container 10b.

The outwardly sloping walls of the containers allow the upper container 10a to slide down nestingly into the lower container 10b. When the empty containers are nested as shown in FIG. 3, the floor portions thereof are spaced a second distance $D_2$ apart which is much less than the first distance $D_1$ of FIG. 2. This second distance $D_2$ is sufficient to allow empty containers to be closely nested within one another, and as an illustrative example, may be 1–4 cm.

Generally speaking, it is important for purposes of smooth dispensing of wire or other elongate coiled materials from the container 10, that the inner surface of the first substantially cylindrical member 12 and the outer surface of the second substantially cylindrical member 15 be circular in cross section As shown, for example, the second substantially cylindrical member 15 is more in the shape of a truncated cone, but still has a circular cross section along its full height.

Figure 4:
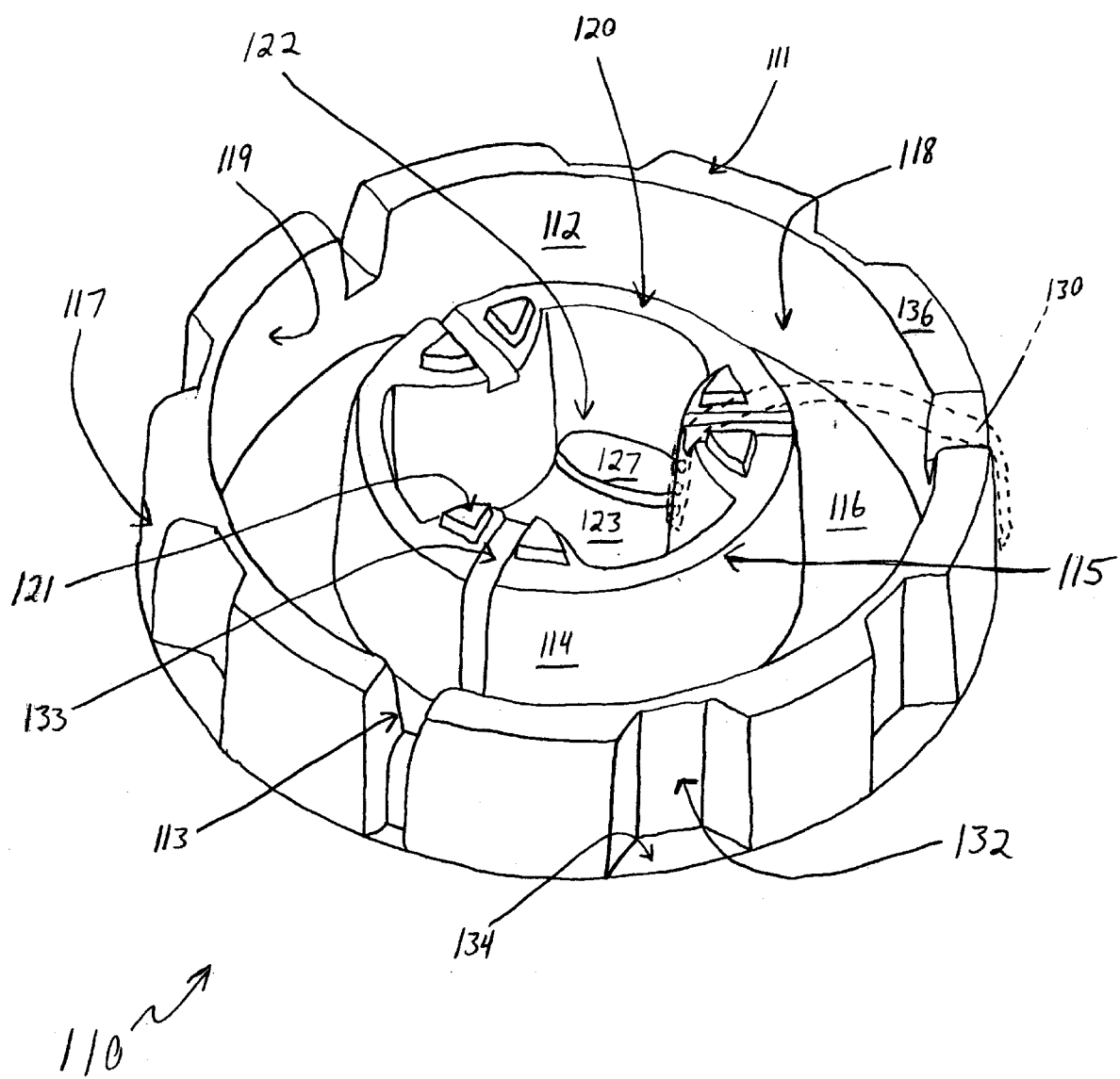
FIG. 4 is a perspective view of a storage container in connection with a second embodiment of the invention.

Referring now to FIG. 4, a storage container in accordance with a second embodiment of the present invention is shown generally at 110. The second preferred embodiment is substantially similar to the first embodiment 10 as described herein, with the further addition that the container 110 according to this embodiment includes a double-walled first, or outer substantially cylindrical wall member 112, and the central boss 115 has only one large recess 122. The storage container 110 i also usable for storing, transporting, and dispensing elongate materials. Except for preferences and aspects related to the double-walled outer member, and the single center recess, all other preferences and aspects are the same as the first preferred embodiment The container 110 is preferably formed as a one-piece, unitary member by vacuum molding, but could be formed by injection molding or other molding processes.

The container body 111 includes a first, or outer, substantially cylindrical wall member or portion 112, and a second, inner, substantially cylindrical wall member or portion 114 located concentrically within the first wall member. A container floor or bottom 116 interconnects the lower ends of the cylindrical wall members to define an annular channel 118 therebetween for storing a coil (not shown) of wire or other elongate material therein. Additionally, the outer wall member 112 has at least one dispensing aperture 113 defined in an upper portion thereof for dispensing the elongate material through. The dispensing aperture 113 is preferably a U-shaped cut-out, but may also be defined as a hole.

Preferably, the inner wall member 114 forms the outer surface of a central boss 115 which is provided as an integral part of the container body 111. The central boss 115 extends upwardly from the floor 116, and includes a substantially horizontal load support surface 120, which closes the upper end of the second cylindrical wall member 114. Preferably the horizontal load support surface 120 includes a plurality of raised alignment tabs 121. The central boss 115 has at least one recess 122 formed therein and extending downwardly from the load support surface 120 within the container 110. At the bottom of the recess 122, and preferably co-planar with the floor 116, a solid, flat ledge 123 is provided which is integrally formed with the rest of the container body 111. Preferably, the flat ledge 123 includes a plurality of alignment shoulders 127, corresponding m number with the raised alignment tabs 121.

In this embodiment, the outer, substantially cylindrical wall member 112 is double-walled, having an interior wall 119 and an exterior wall 117. A horizontally oriented sill 136 is also attached to the top of the outer wall member 112, interconnecting the interior wall 119 and the exterior wall 117. This is different than the first embodiment which includes the single-wall outer member 12 and the lip 36 around the upper edge thereof.

Another feature of the embodiment of FIG. 4 is that the container body 111 has a plurality of inwardly extending indentations or recesses 132 formed in the exterior wall 117 of the outer wall member 112, spaced about the circumference of the container 110, each having a support floor 134.

Optionally, the central boss 115 may have a plurality of substantially U-shaped cutouts 133 formed therein, with one of the cutouts aligned with, and spaced diametrically across from, each of the dispensing apertures 113 in the outer wall member 112. The container 110 may further include at least one securement means 130 attached to an upper portion of the container body 111, and each securement means is diametrically aligned with a corresponding dispensing aperture 113, to allow for securement of the coiled elongate material by a strap, bar, wire, or other securement structure. For ease of fastening and unfastening any securement means, the securement means 130 preferably includes paired cooperating material straps having a hook and loop fastener, such as the material sold commercially under the mark "VELCRO®".

Figure 5:
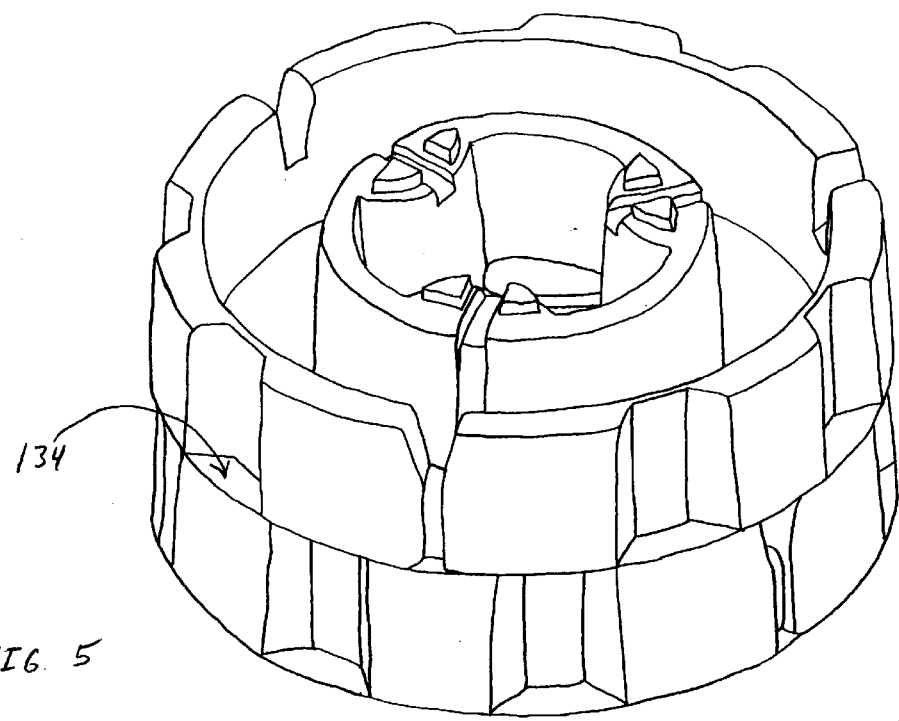
FIG. 5 is a perspective view of a pair of identical storage containers according to the embodiment of FIG. 4, stacked vertically spaced apart in a first relation thereof.
Figure 6:
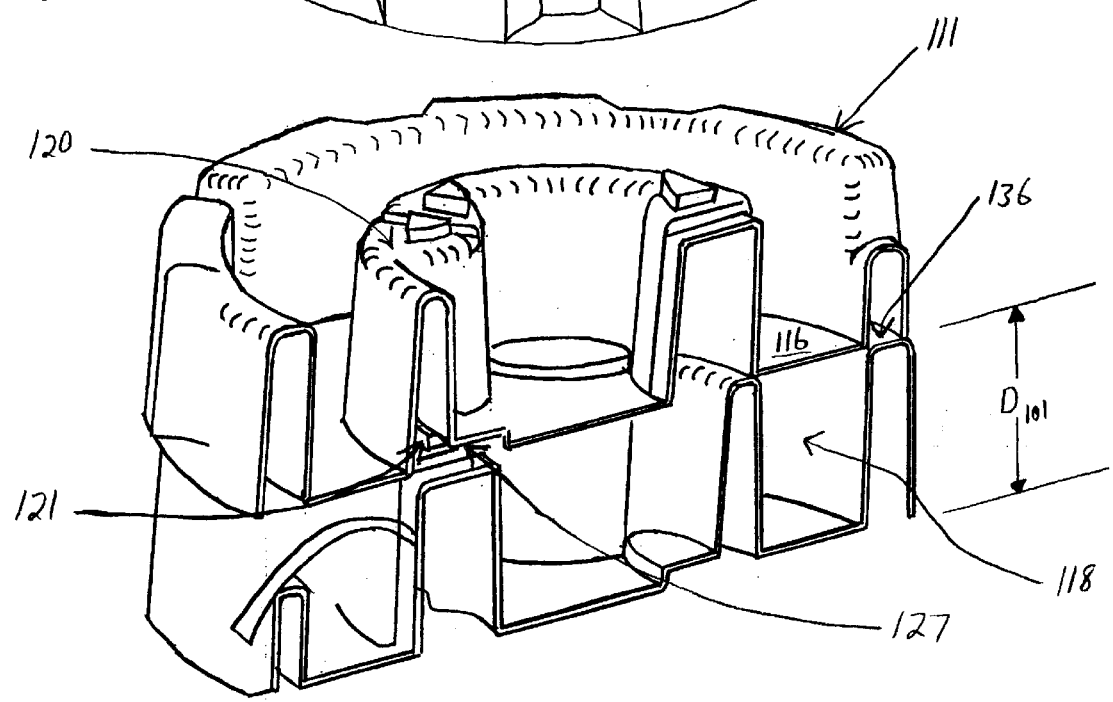
FIG. 6 is a perspective view, partially cut away and showing a cross section of the storage containers of FIG. 4, stacked vertically spaced apart in the first relation thereof

Referring now to FIGS. 5 and 6, it may be seen that a pair of identical storage containers 110a, 110b are shown stacked vertically spaced apart in a stacked configuration thereof. This first configuration is intended for efficiently stacking multiple filled containers 110 together, in a warehouse, a transport trailer or storage room, for storage of the material held therein. A cross-sectional slice through the containers 10a, 10b is shown in FIG. 6 for purposes of illustration.

In this first configuration of the containers 110a, 110b, the upper container is rotated into misalignment about a vertical axis passing through the center thereof, with respect to the orientation of the lower container, thus establishing a stacked configuration. As a result, the alignment shoulders 127, seat on to the raised alignment tabs 121 formed in the support surface 120 of the lower container 110b, where such alignment tabs and shoulders are present. Also, in this first relation of the containers 110a, 110b, the indentation support floor portions 134 of the upper container 110a rest on top of the sill 136 of the lower container. In this way, and as shown by the cross-sectional view in FIG. 7, the upper container 110a is supported by the lower container 110b with the floors 116, as well as the interior storage channels 118 of the adjacent containers, spaced apart a first distance $D_{101}$ from one another. This first distance is sufficient to allow full containers to be stacked on top of one another, and as an illustrative example, may be 12–18 cm.

In a second configuration (not shown), multiple containers 110a and 110b can be disposed vertically and nestingly close together on top of one another when empty, to allow for efficient use of space during shipping or storage thereof in an empty condition. In this second configuration, the containers 110a, 110b are oriented with their recess 122, their raised alignment tabs 121, their indentations 132, and their other various parts in perfect alignment with one another.

When aligned in this way, the sloping walls and the hollow design of the containers allow the upper container 110a to slide down nestingly into the lower container 110b. When the empty containers are disposed nestingly, the floor portions thereof are spaced a second distance $D_{102}$ apart which is much less than the first distance $D_{101}$ of FIG. 7. This second distance $D_{102}$ is sufficient to allow empty containers to be stacked on top of one another, and as an illustrative example, may be 2–4 cm. As in the first embodiment, the nested, empty containers occupy approximately ½–¼ of the space occupied by the stacked, full containers. Of course, the indentations 132 could alternatively or additionally be provided in the inner wall 119, rather than just in the outer wall 117 as shown Referring now to FIGS. 7–11, there is shown a container 210 according to a third embodiment of the present invention, which is also usable for storing, transporting, and dispensing elongate materials. The container 210 includes many features similar to those of the container 10 of the first embodiment and the container 110 of the second embodiment as described above, including: a single-walled first, or outer substantially cylindrical wall member 212; a central boss 215 with an outer wall 214, a closed end one large recess 122 extending downwardly to a flat ledge 223 coplanar with a floor 216, and an inner wall with two projections 225 extending inwardly therefrom; the bottom or floor 216 joining the wall members 212, 214 to define an annular channel therebetween; a plurality of outwardly extending indentations, recesses or alcoves 232, 233 formed in the outer wall member 212; the floor 216 has a series of integral tab sections or projections 234 extending radially outwardly below the alcoves 232; the projections 225 on the inner wall of the central boss 215 have upper surfaces 226, 228 which are at a level slightly below the upper surface of the remainder of the boss; and an upper lip 236 extending around the upper edge of first or outer wall member 212, and has seats 237 defined therein.

The storage container 210 is different from the containers 10, 100 in that it does not include any securement means connected to the container for securing coiled wire or other elongate materials in the annular channel, nor does it include any recesses or openings formed in the upper surfaces of the wall members 212, 215 for receiving the securement means therethrough, or for dispensing of the coiled material from the container. Instead, a separate, non-connected securement means could be provided, while the coiled wire or other elongate material would simply be dispensed upwardly from the container or over a portion of the lip 236. Also, the container 210 is different in that: the recesses 232, 233 formed in the outer wall member 212 have different shapes from each other, supplemental securing means 230, 231, 239 are provided for providing additional support for the containers when disposed in the stacked configuration thereof; drain holes 240 are provided in the bottom or floor 216 and in the flat ledge 223; and an outermost shape of the lip 236 is polygonal, rather than round, all as discussed further below. The container 210 is preferably formed with the same materials and in the same manner as the container 10 of the first embodiment.

Figure 8:
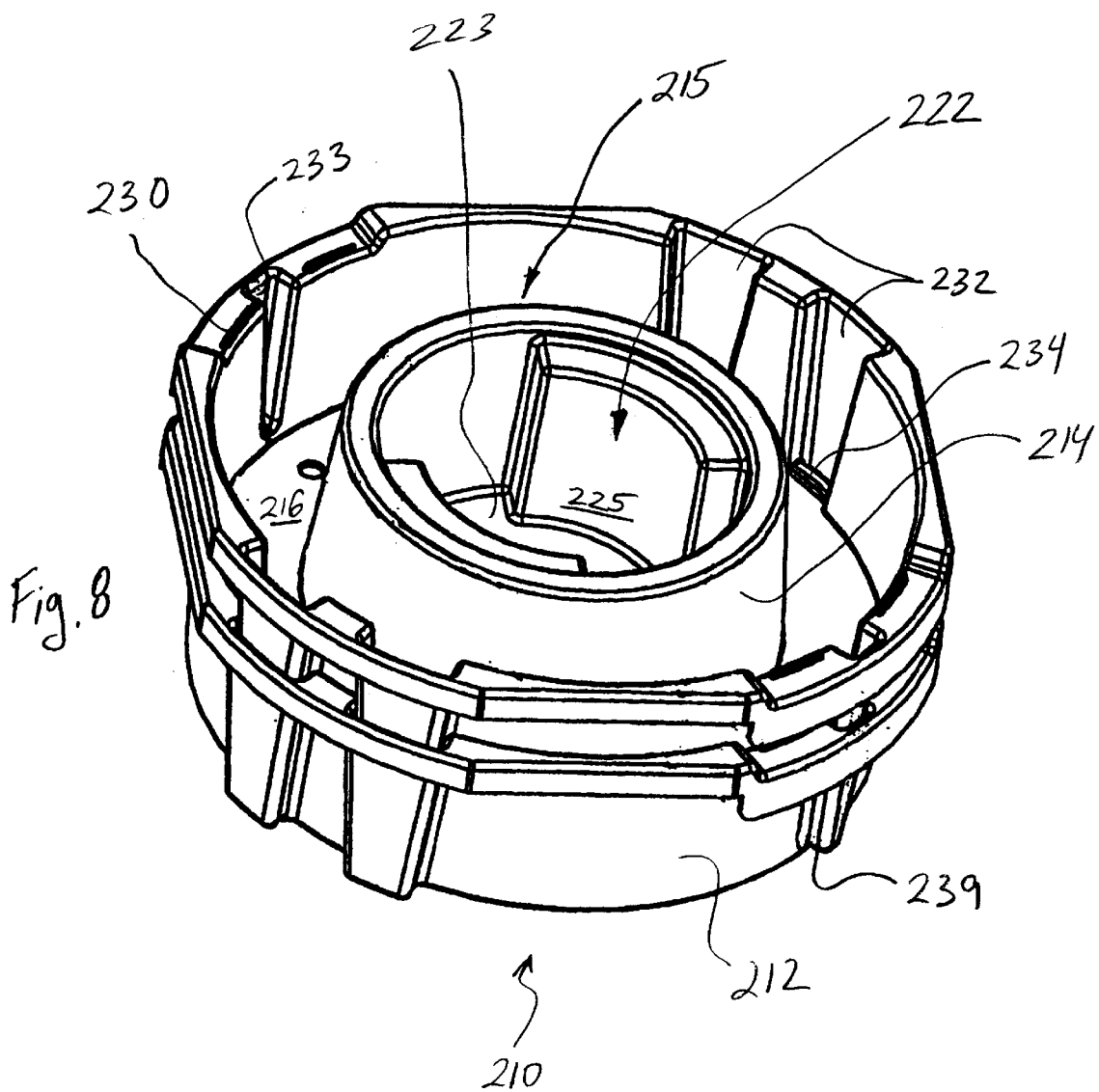
FIG. 8 is a perspective view of the two storage containers of FIG. 7, but in a nested configuration thereof.
Figure 1A:
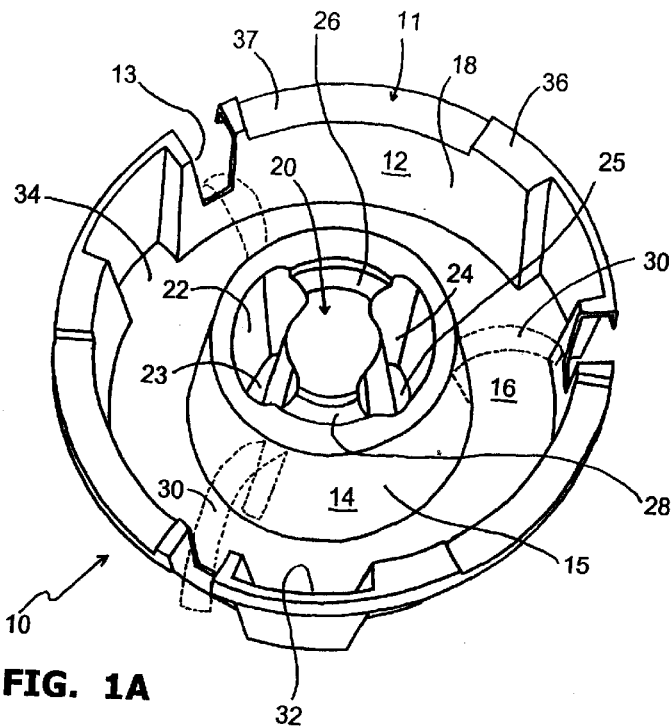
Figure 1B:
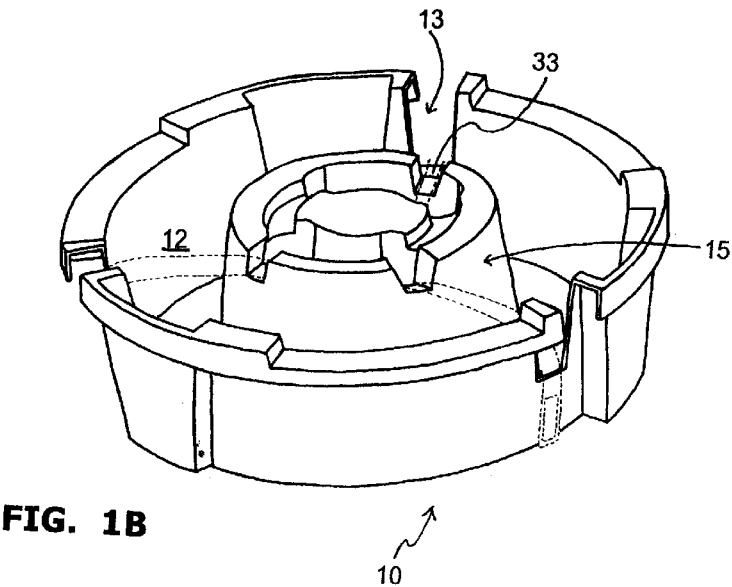
Figure 2:
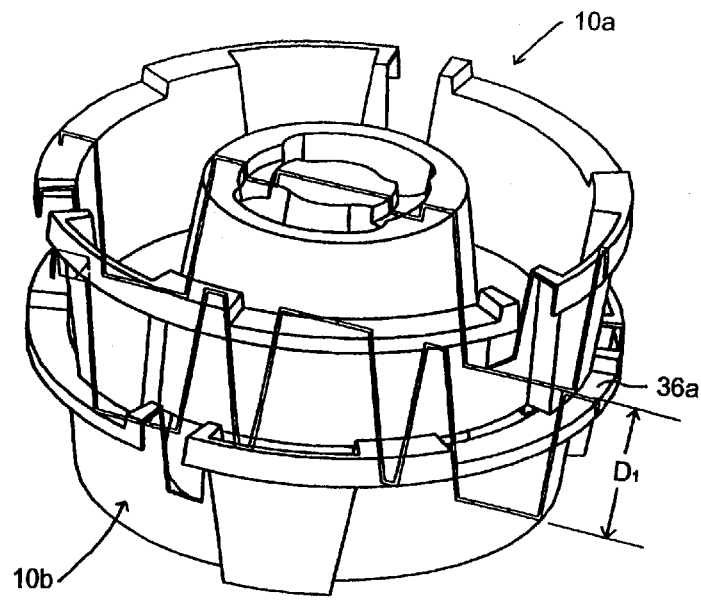
Figure 3:
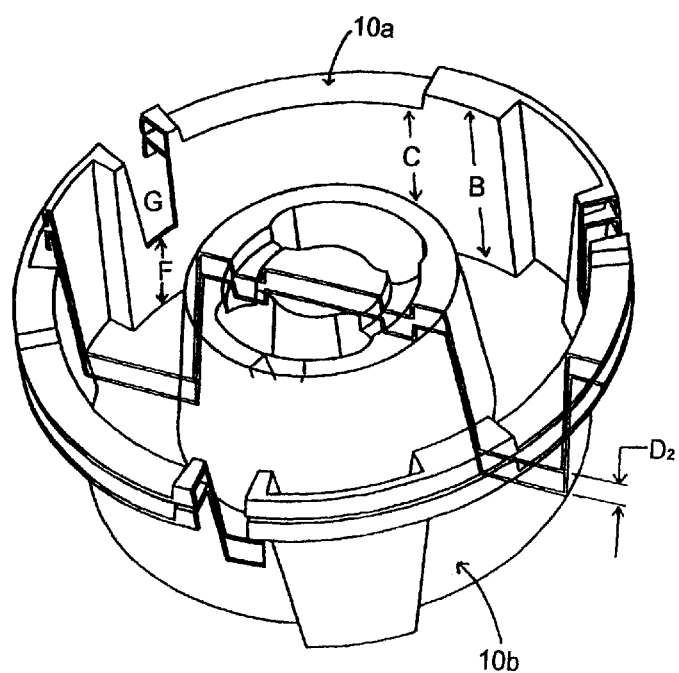
Figure 4:
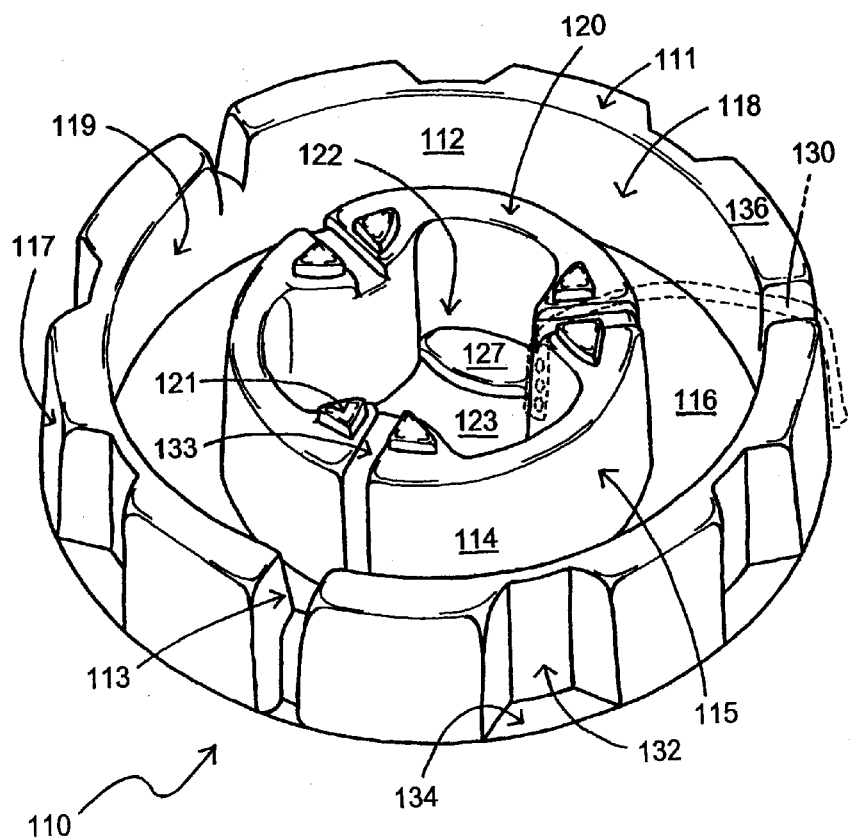
Figure 5:
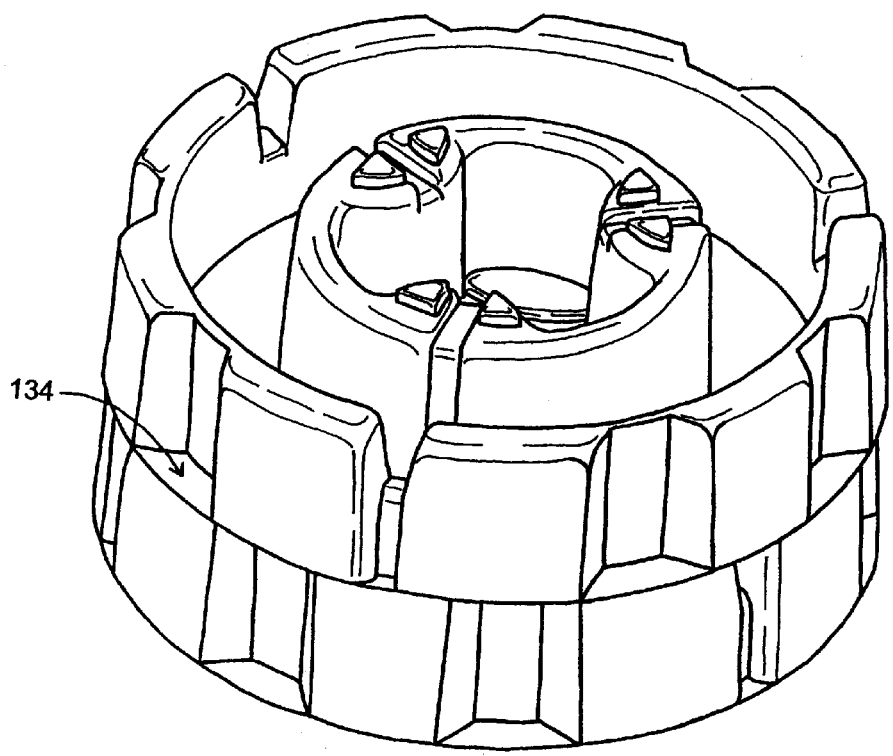
Figure 6:
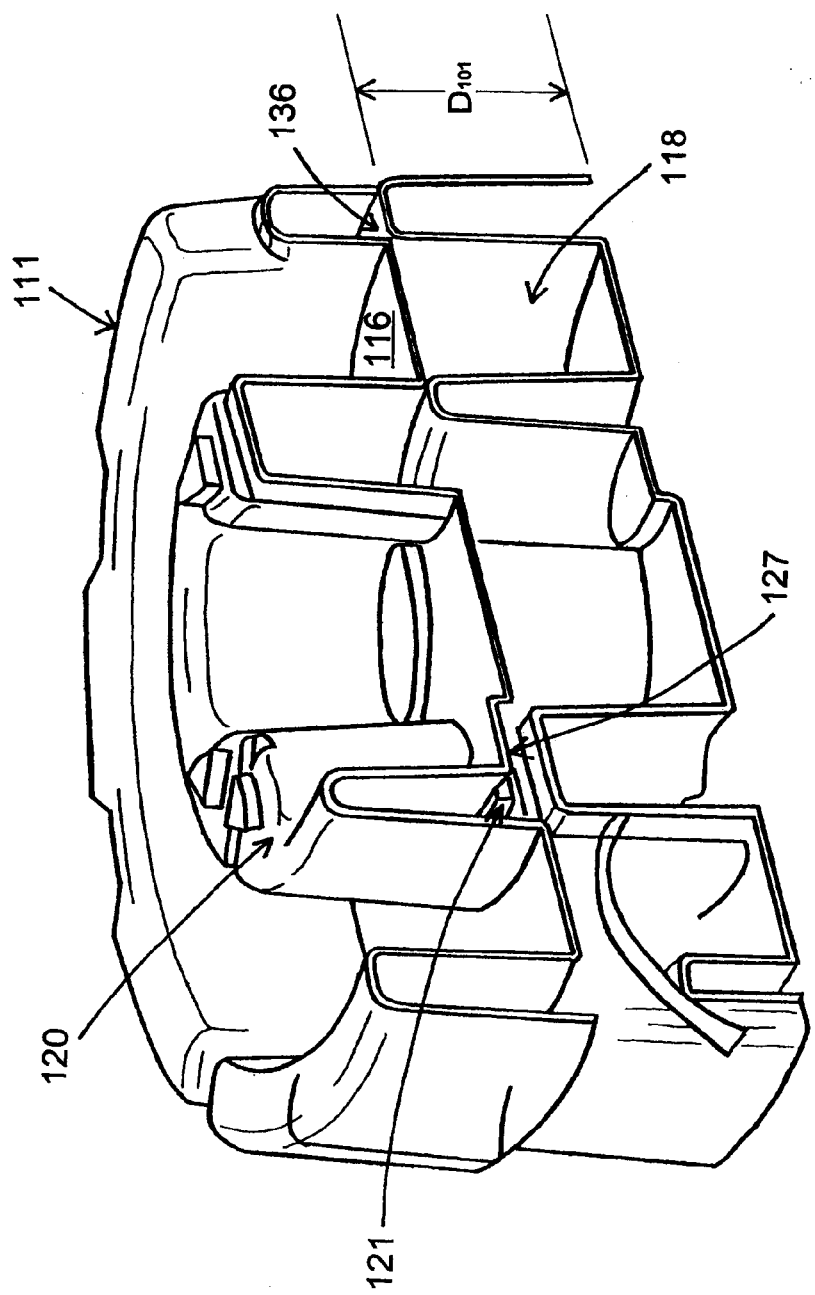
Figure 7:
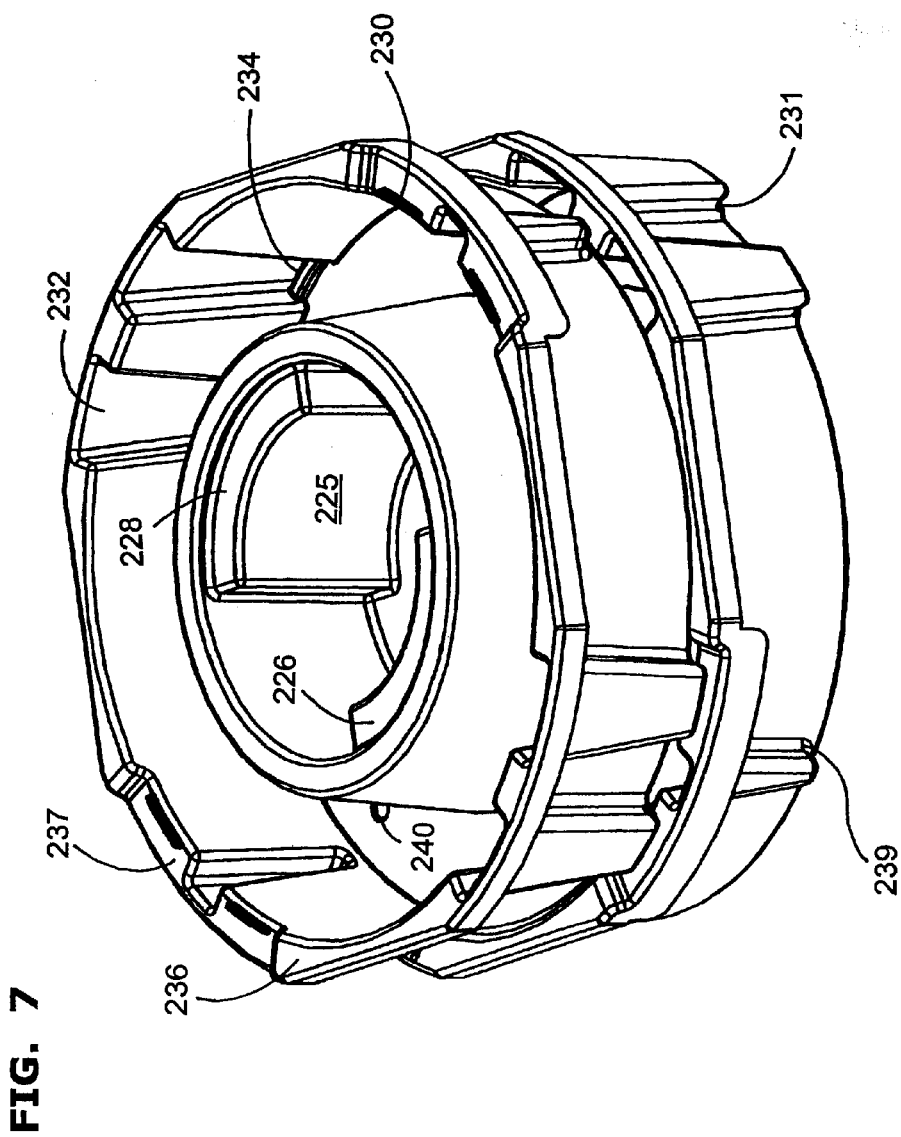
FIG. 7 is a perspective view of a two identical, stacked storage containers in connection with a third embodiment of the invention.
Figure 8:
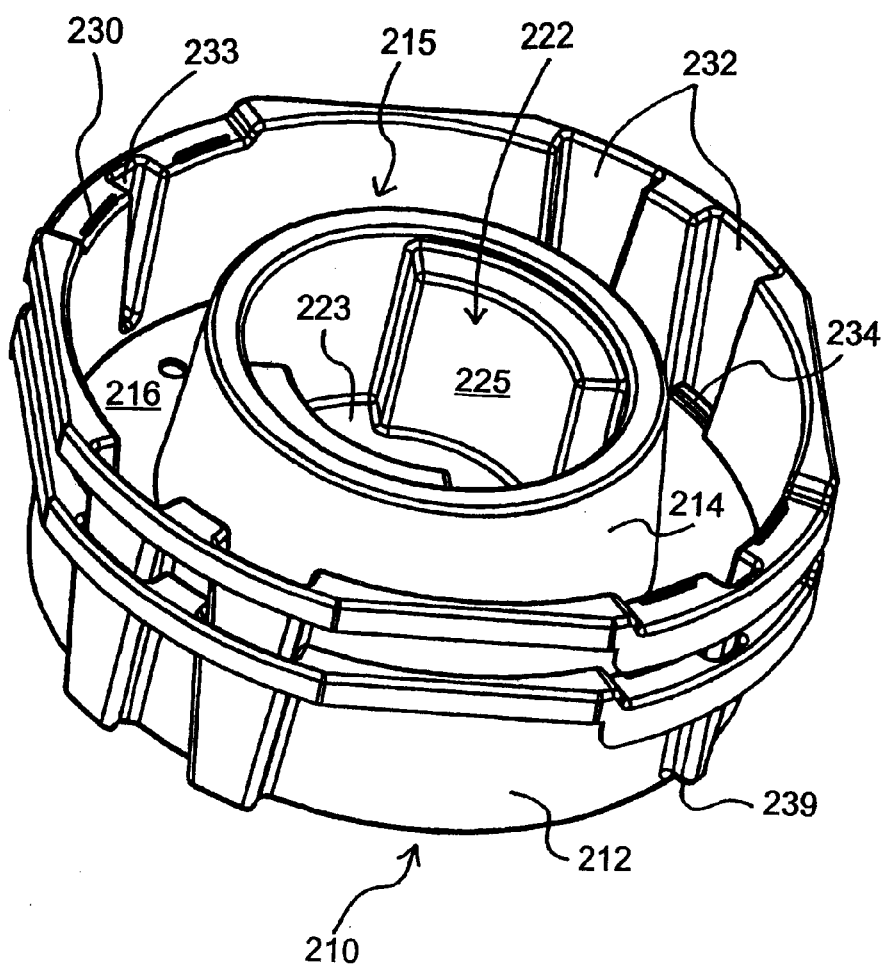

As shown in FIGS. 7–10E, the container 210 preferably includes two pairs of the recesses 232 disposed directly across from each other on the wall member 212, and two of the recesses 233 disposed directly across from each other on the wall member 212, 90° out of alignment with the recesses 232. Thus, two or more of the containers 210 (as filled with wire or other elongate material) can be disposed in a stacked configuration thereof by aligning the recesses 232 of one container over the recesses 233 of a second underlying container (as shown in FIG. 7), while the empty containers can be disposed in a nested configuration thereof by aligning the recesses 232, 233 of one container respectively and directly over the recesses 232, 233 of the underlying container (as shown in FIG. 8).

Further, the seats 237 are disposed only in portions of the lip 236 adjacent the recesses 233, while pairs of upwardly extending projections 230 are provided on the seats 237, and recesses 231 for mating with the projections 230 are provided on lower portions of the container defining the recesses 232 when two or more of the containers 210 are disposed in the stacked configuration thereof. Similarly as shown, lower ends of the recesses 233 have stepped shoulders 239 defined therein such that the lower ends of the recesses 233 can engage the upper surfaces of the lip 236 between pairs of the recesses 232 when two or more of the containers 210 are in the stacked configuration thereof. Again, the components 230, 231, 239 function as a supplemental securing means for providing additional support for the containers 210 when disposed in the stacked configuration thereof. Of course, it is possible to reverse the nature of components 230, 231, 239, e.g., instead of projections 230 provided on the lip 236 and recesses 231 provided on lower ends of the container, downwardly extending recesses could be defined in the lip 236 and downwardly extending projections could be provided on the bottom surface of the outer wall portion 212.

As best shown in FIG. 9, the outer periphery of the upper lip 236 is polygonal in shape, particularly octagonal, although the outer wall member 212 has a circular cross section which is important for dispensing wire or other elongate material from the annular channel of the container. Such polygonal shape is different than the circular shape of the outer periphery of the upper lip 36 of container 10 or the circular shape of the outer wall 117 in the container 110. The polygonal shape of the outer periphery of the lip 236 is desirable for reducing a width dimension of the container, and thus permitting more of the containers to be stored in a given area, while still maintaining high strength and rigidity of the container 210.

Although the present invention has been described herein with respect to preferred embodiments thereof, the foregoing description is intended to be illustrative, and not restrictive. Many modifications may be made to the described embodiments without departing from the scope hereof. For example, and in addition to those mentioned above, the strap type securement means 30 need not be fixed to the container, but may provided separately and simply secured around the coiled wire or other elongate material disposed in the annular channel of the container. Further, the recesses 13, 33 defined in the upper ends of the substantially cylindrical members could be replaced with openings defined through vertically intermediate portions of the substantially cylindrical members. Also, different numbers, shapes and arrangements of the recesses and projections may be provided relative to the substantially cylindrical wall members than those shown in the depicted embodiments. All such modifications, which fall within the scope of the appended claims, are intended to be within the scope and spirit of the present invention.

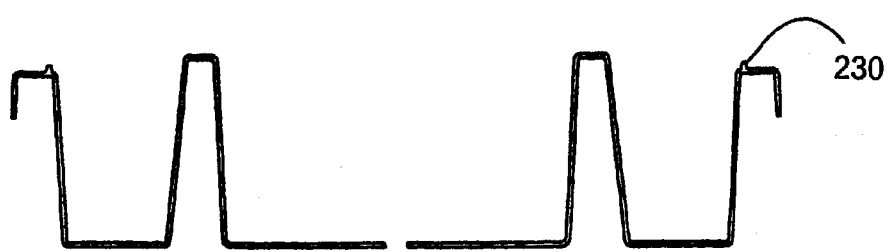
FIG. 10E
FIG. 11
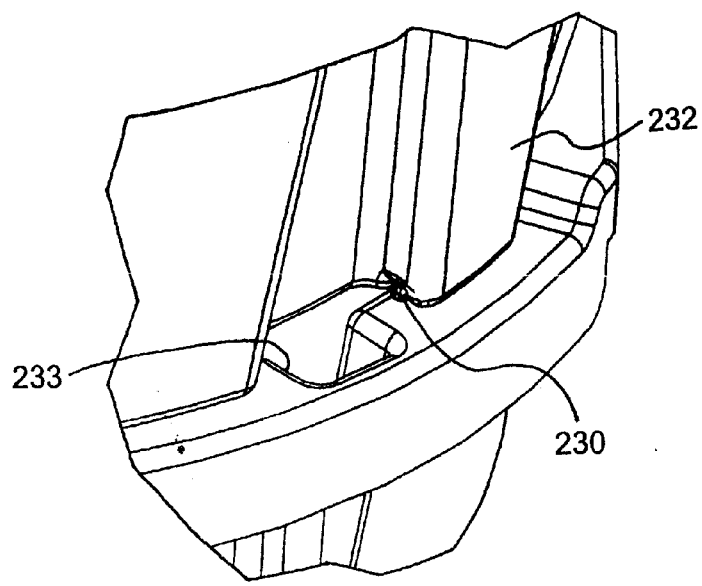

What is claimed is:

1. A reusable container for storing, transporting, and dispensing elongate materials, the container comprising:
    a first substantially cylindrical portion;
    a second substantially cylindrical portion located concentrically within the first portion;
    a container bottom interconnecting the lower ends of the substantially cylindrical portions so as to define an annular channel therebetween for storing a coil of elongate material therein; and
    means provided with at least one of said first and second cylindrical portions for securely supporting an identical second container thereon when the second container is in a rotatively aligned stacking configuration with the first container, and for compactly receiving the second container in the annular channel when the second container is in a rotatively aligned nesting configuration with the first container.

2. A container for elongate materials as recited in claim 1, wherein said first and second substantially cylindrical portions slopingly diverge with respect to one another, such that a width of said channel slopingly increases, extending upwardly from said container bottom.

3. A container for elongate materials as recited in claim 1, further comprising a wall closing an end of said second substantially cylindrical portion.

4. A container for elongate materials as recited in claim 3, said wall closing the end of the second substantially cylindrical portion has at least one recess defined therein extending downwardly within said second substantially cylindrical portion.

5. A container for elongate materials as recited in claim 1, wherein said first substantially cylindrical portion has at least one aperture defined in an upper section thereof for dispensing the elongate material therethrough, and said second substantially cylindrical portion has at least one securement aperture defined in an upper section thereof diametrically aligned with each said dispensing aperture.

6. A container for elongate materials as recited in claim 5, wherein each said aperture is defined as a hole.

7. A container for elongate materials as recited in claim 5, wherein said apertures have rounded edges.

8. A container for elongate materials as recited in claim 1, said container further comprising a means for securing said elongate material within said channel of the container.

9. A container for elongate materials as recited in claim 8, wherein said securement means further comprising a plurality of straps having first ends fixed to said container and second ends which are electively, operatively securable to said container.

10. A container for elongate materials as recited in claim 1, wherein said supporting and receiving means are provided with both said first and second substantially cylindrical portions.

11. A container for elongate materials as recited in claim 10, wherein said supporting and receiving means includes at least one of projections and recesses provided on said first and second substantially cylindrical portions.

12. A container for elongate materials as recited in claim 10, wherein said supporting means includes a plurality of recesses defined in said first substantially cylindrical portion.

13. A container for elongate materials as recited in claim 10, wherein said supporting means includes a plurality of differently shaped recesses defined in said first substantially cylindrical portion.

14. A container for elongate materials as recited in claim 10, wherein said first substantially cylindrical member further comprises one of a lip and a sill extending outwardly from an upper edge thereof substantially continuously along the circumference of said first substantially cylindrical portion.

15. A container for elongate materials as recited in claim 14, wherein said one of said lip and said sill has an outer periphery which is polygonal in shape.

16. A container for elongate materials as recited in claim 1, further including supplemental securing means for providing additional support for said containers when disposed on top of another said container in the stacked configuration thereof.

17. A container for elongate materials as recited in claim 16, wherein said first substantially cylindrical member further comprises one of a lip and a sill extending outwardly from an upper edge thereof substantially continuously along the circumference of said first substantially cylindrical portion, and said supplemental securing means includes at least one of projections and recesses provided on said lip.

18. A method of storing and transporting elongate material comprising the steps of:

coiling said elongate material into a container comprising:
a first substantially cylindrical portion;
a second substantially cylindrical portion located concentrically within the first portion;
a container bottom interconnecting the lower ends of the substantially cylindrical portions so as to define an annular channel therebetween for storing a coil of elongate material therein; and
means provided with at least one of said first and second cylindrical portions for securely supporting an identical second container thereon when the second container is in a rotatively aligned stacking configuration with the first container, and for compactly receiving the second container in the annular channel when the second container is in a rotatively aligned nesting configuration with the first container;

stacking said containers in said stacking configuration thereof;

transporting said stacked containers;

emptying said elongate material from each said container;

nesting the empty containers in said configuration thereof; and transporting said nested containers.

19. A reusable container for storing, transporting, and dispersing elongate materials, the container comprising:

an outer wall portion;

an inner wall portion located concentrically within the first portion;

a container bottom interconnecting the lower ends of the inner and outer wall portions so as to define an endless channel therebetween for storing a coil of elongate material therein; and means provided with at least one of said inner and outer wall portions for securely supporting an identical second container thereon when the second container is in a rotatively aligned stacking configuration with the first container, and for compactly receiving the second container in the endless channel when the second container is in a rotatively aligned nesting configuration with the first container.

20. A container for elongate materials as recited in claim 19, wherein said inner wall portion is substantially cylindrical slopingly tapers from a larger diameter at a lower end thereof to an upper end thereof, such that a width of said channel slopingly increases, extending upwardly from said container bottom.

* * * * *

UNITED STATES PATENT AND TRADEMARK OFFICE
CERTIFICATE OF CORRECTION

PATENT NO. : 6,296,118 B1
DATED : October 2, 2001
INVENTOR(S) : John W. Speck

It is certified that error appears in the above-identified patent and that said Letters Patent is hereby corrected as shown below:

Title page,
Replace the title page drawing figures, with the corrected FIGS. 7 and 8, respectively. Corrected FIGS. 7 and 8 are attached hereto.

Drawings,
Replace drawing sheets 1 through 7 with the corrected formal drawing sheets 1 through 10, as attached hereto.

Column 1,
Line 10, between "thereof" and "More" insert a period.

Column 2,
Line 10, change "strong" to -- storing --.

Column 4,
Line 16, after "thereof" insert a semicolon.
Line 17, begin a new paragraph with "FIG. 7"; change "a two" to -- two --.
Line 22, after "view" insert -- of --.
Line 28, change "a enlarged" to -- an enlarged --.

Column 5,
Line 24, change "sightly" to -- slightly --.
Line 34, change "secure: to -- securement --.

Column 6,
Line 10, between "present" and "In" insert a period.
Line 51, between "section" and "As" insert a period.
Line 63, change "i also" to -- is also --.

Column 7,
Line 29, change "m num-" to -- in num- --.

Column 8,
Line 66, change "100" to -- 110 --.

Column 9,
Line 58, after "section" insert a comma; change "dispenning" to -- dispensing --.

UNITED STATES PATENT AND TRADEMARK OFFICE
CERTIFICATE OF CORRECTION

PATENT NO.    : 6,296,118 B1
DATED         : October 2, 2001
INVENTOR(S)   : John W. Speck It is certified that error appears in the above-identified patent and that said Letters Patent is hereby corrected as shown below:

Column 10,
Line 8, after "may" insert -- be --.
Line 48, before "said" insert -- wherein --.
Line 67, delete "wherein".

Column 12,
Line 26, change "first" to -- outer wall --.
Line 41, after "slopingly" insert -- and --.

Signed and Sealed this

Twenty-fifth Day of June, 2002

Attest:

JAMES E. ROGAN
Attesting Officer    Director of the United States Patent and Trademark Office

Figure 10B:
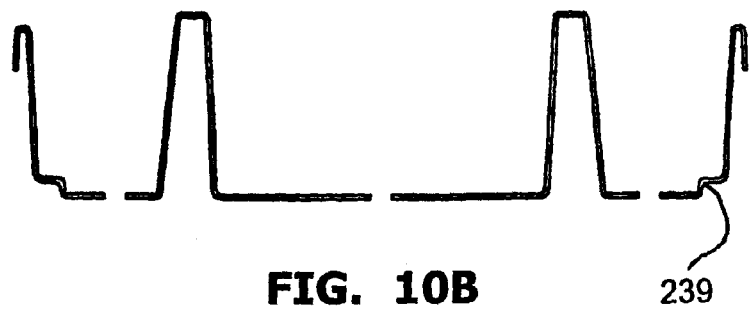
Figure 10C:
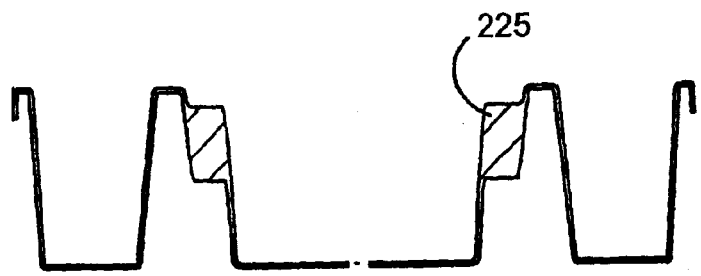
Figure 10D:
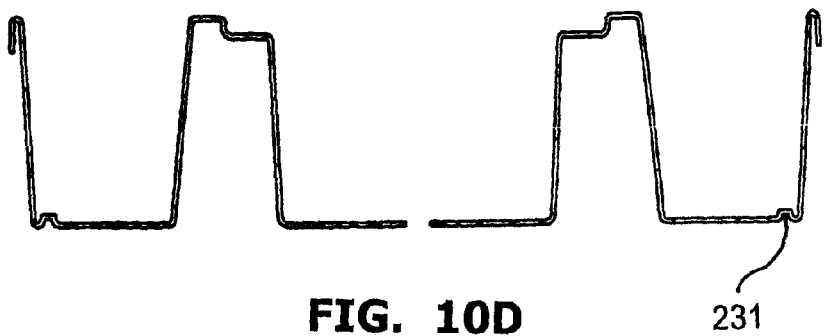

FIG. 9
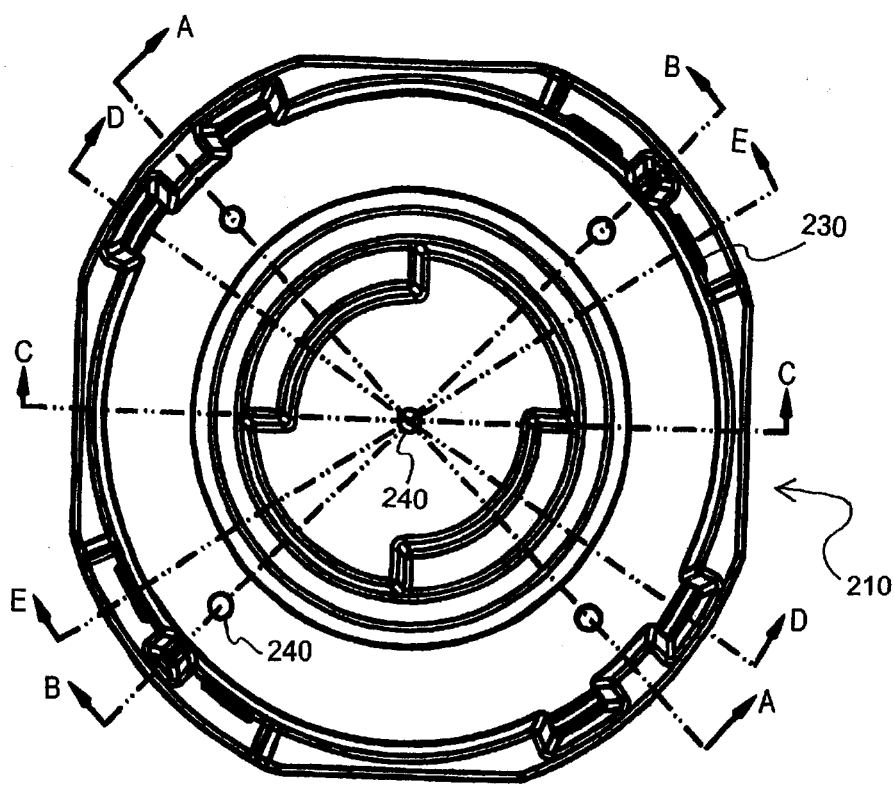
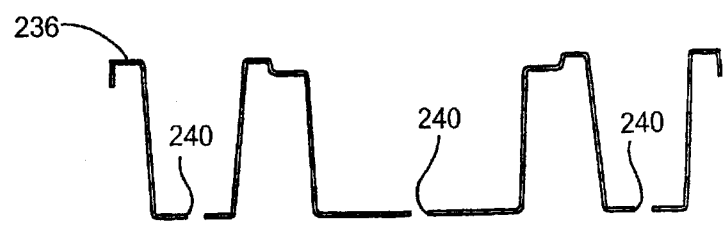
FIG. 10A